Feb. 12, 1952  R. A. SANDBERG  2,585,852
RESILIENT BATT CUTTING MACHINE
Filed Jan. 29, 1948  9 Sheets-Sheet 1

Inventor
RAY A. SANDBERG
by The Firm of Charles W. Hills Attys

Fig. 6

Feb. 12, 1952     R. A. SANDBERG     2,585,852
RESILIENT BATT CUTTING MACHINE
Filed Jan. 29, 1948     9 Sheets-Sheet 7

*Inventor*
RAY A. SANDBERG
By The Firm of Charles W. Hills
*Attys.*

Feb. 12, 1952     R. A. SANDBERG     2,585,852
RESILIENT BATT CUTTING MACHINE
Filed Jan. 29, 1948     9 Sheets-Sheet 8

Inventor
Ray A. Sandberg
by The Firm of Charles W. Hills
Attys.

Feb. 12, 1952     R. A. SANDBERG     2,585,852
RESILIENT BATT CUTTING MACHINE
Filed Jan. 29, 1948     9 Sheets-Sheet 9

Inventor
RAY A. SANDBERG
by The Firm of Charles W. Hills Attys.

Patented Feb. 12, 1952

2,585,852

UNITED STATES PATENT OFFICE 2,585,852

RESILIENT BATT CUTTING MACHINE

Ray A. Sandberg, Waukegan, Ill., assignor to Houdaille-Hershey Corporation, Detroit, Mich., a corporation of Michigan Application January 29, 1948, Serial No. 5,016

11 Claims. (Cl. 164—21)

This invention relates to improvements in a machine for severing articles from a resilient batt of material, although the invention may have other uses and purposes as will be apparent to one skilled in the art.

Difficulty has been experienced in the past, in connection with mechanism for cutting various articles from a resilient batt, especially if the batt is of fibrous material, owing to the undesired compression of the batt during the cutting operation resulting in a severed article having a bulging or non-uniform contour, especially when that article was removed from a batt several inches in thickness. Particularly with a fibrous batt, difficulty was experienced in the cutting of an article having a smooth uniform surface adjacent the line of cut, rather than a somewhat frayed and disrupted surface owing to the tearing and pulling loose of fibers during the cutting operation. Further, heretofore in the cutting of resilient batts, and especially resilient batts of fibrous material, extreme care and the services of skilled operators were required, and even so, many severed articles had to be discarded owing to defects in the cutting, thereby adding materially to the cost of manufacture.

With the foregoing in mind, it is an important object of the instant invention to provide a machine capable of readily severing articles from a resilient batt of material, leaving the outer surface of the severed articles smooth and uniform substantially regardless of the density of the batt.

Another object of this invention is the provision of a machine capable of successively severing articles rapidly and smoothly from intermediate locations in a substantially continuous and resilient fibrous batt.

Also an object of this invention is the provision of a cutting machine capable of severing articles from a batt of resilient material, and in which the severed articles are automatically retained in position in the batt skeleton and moved along therewith after the cutting operation has been completed.

Another feature of the invention resides in the provision of a cutting machine for severing articles from resilient batts wherein a plurality of pieces are cut from the batts simultaneously in a single cutting operation with one piece being disposed inside the other, and with both pieces retained in position in the batt skeleton after the cutting operation is completed.

It is also a feature of this invention to provide a cutting machine for severing articles from a resilient batt in which multiple rows of articles may be severed from a single batt of material.

Still a further object of this invention is the provision of a machine for severing articles from batts of resilient material, which machine requires the attention of but a single operator, and necessitates only extremely simple duties on the part of that operator, while efficiently and successively severing articles from a batt with substantially no wastage whatever due to faulty cutting.

It is also an object of this invention to provide a machine capable of severing articles, such for example as filter units for automotive air cleaners, from a sisal fiber batt.

It is also an object of this invention to provide a machine for severing articles from a resilient batt of fibrous material, wherein a plurality of separate cuts are made for each article, and such cuts for the complete severance of one article are made simultaneously so that the entire cutting out of that article is in effect a single operation.

While some of the more salient features, characteristics and advantages of the instant invention have been above pointed out, others will become apparent from the following disclosures, taken in conjunction with the accompanying drawings, in which.

*The machine in general*

Figure 1:
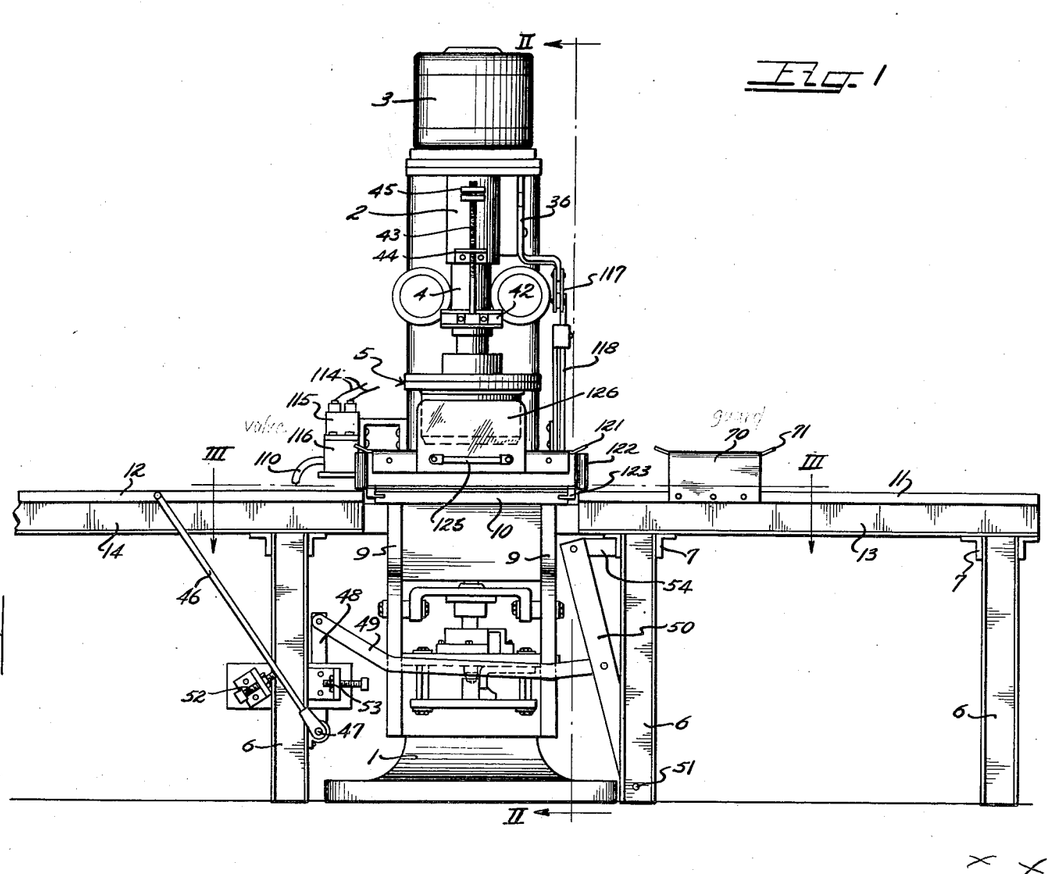
Figure 1 is a front elevation view of a machine embodying principles of the instant invention.
Figure 2:
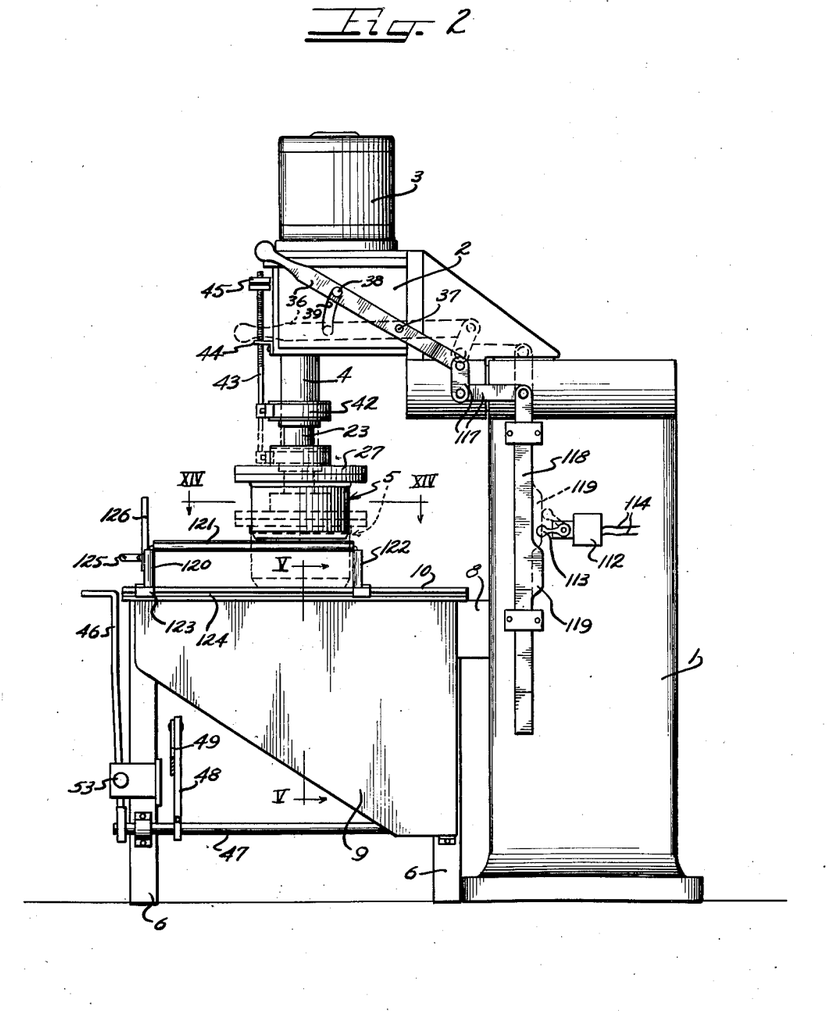
Figure 2 is a vertical sectional view taken substantially as indicated by the line II—II of Fig. 1, looking in the direction of the arrows, and illustrating the central portion of the machine in side elevation.
Figures 3, 4:
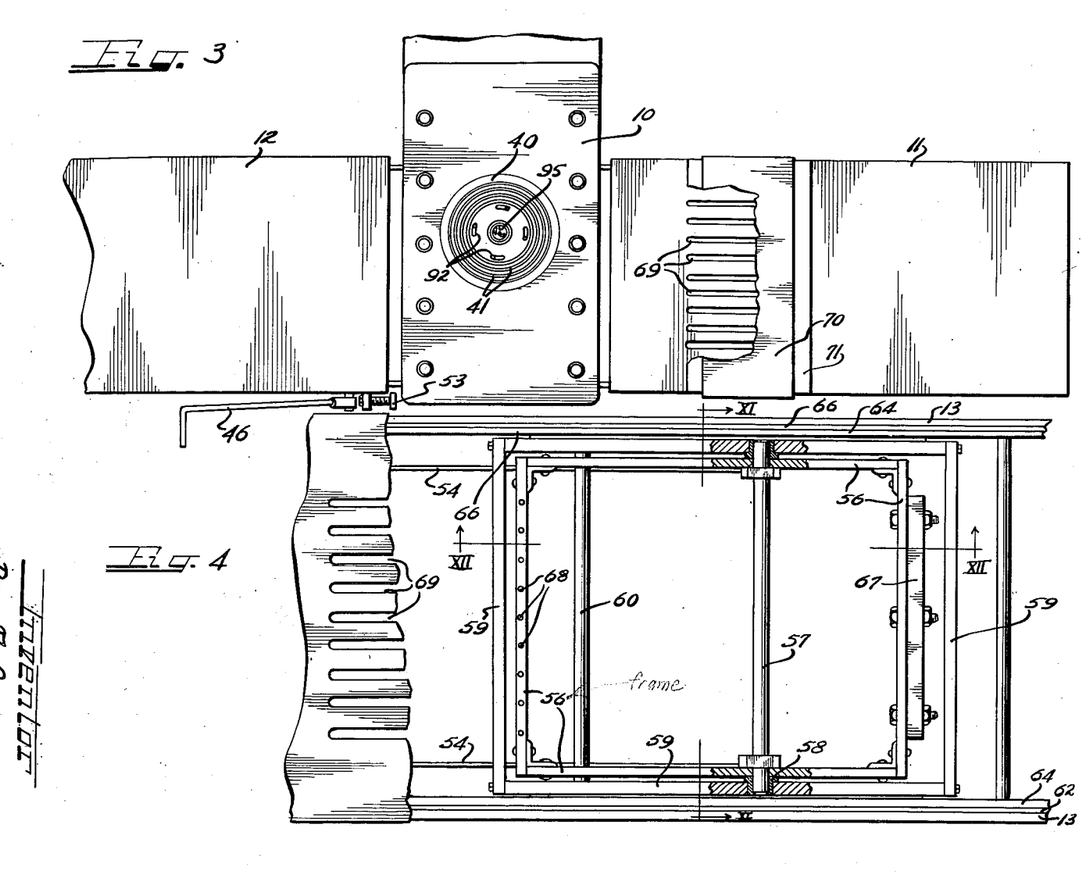
Figure 3 is a fragmentary plan view illustrating the bed of the machine, with parts removed, and parts broken away, taken substantially as indicated by the line III—III of Fig. 1.
Figure 4 is an enlarged fragmentary plan view of the structure seen at the right of Fig. 3, with parts broken away and parts shown in section to illustrate the structure beneath the right hand portion of the bed of the machine.

In general, the illustrated embodiment of the instant invention, with particular reference to Figs. 1, 2 and 3, includes a standard 1 having a forwardly extending superstructure 2 upon which may be mounted a suitable form of prime mover such as an electric motor 3. Depending from the superstructure 2 in the forward part thereof, is quill 4 carrying a spindle rotated from the motor 3 through any suitable speed reduction means which may be mounted in the superstructure. This spindle carries a cutting head generally indicated by numeral 4 which, along with the quill 4, may be raised and lowered in a manner to be later described.

The cutting head is disposed above the work table part of the machine, and the operator preferably stands directly in front of the cutting head. This front portion of the machine includes suitable frame members 6 connected with suitable transverse brace members 7 with the entire structure secured to the standard 1 as indicated at 8 so as to provide adequate stability. As seen best in Figs. 1 and 2, the mechanism disposed beneath the cutting head is mounted on a pair of forwardly extending plates 9—9 which also carry on their upper edges a cutting bed plate 10 situated between bed plates 11 and 12 carried on longitudinally disposed top rails 13 and 14, respectively.

As the machine is viewed in Figs. 1 and 3, the material to be severed by the cutting head moves from right to left; that is, any given portion of a batt rests first upon the bed plate 11, and travels over that bed plate, the cutting bed plate 10, and thence after the cutting operation over the bed plate 12. The movement of the batt of material is intermittent and under the control of the operator, so that the batt is periodically advanced just sufficient to permit the cutting of the next article or transverse row of articles, as the case may be.

The illustrated embodiment of the invention is shown, by way of example, as fitted to sever circular articles having a central opening therethrough, and more specifically of the nature of filter units for air cleaners of the liquid bath type used with automotive engines. While, by simple change in the cutting means, the machine may be fitted to sever articles of different shapes and sizes, a circular filter element has been selected for illustrative purposes because it is commonly considered a difficult element to cut from a resilient batt.

Figure 14:
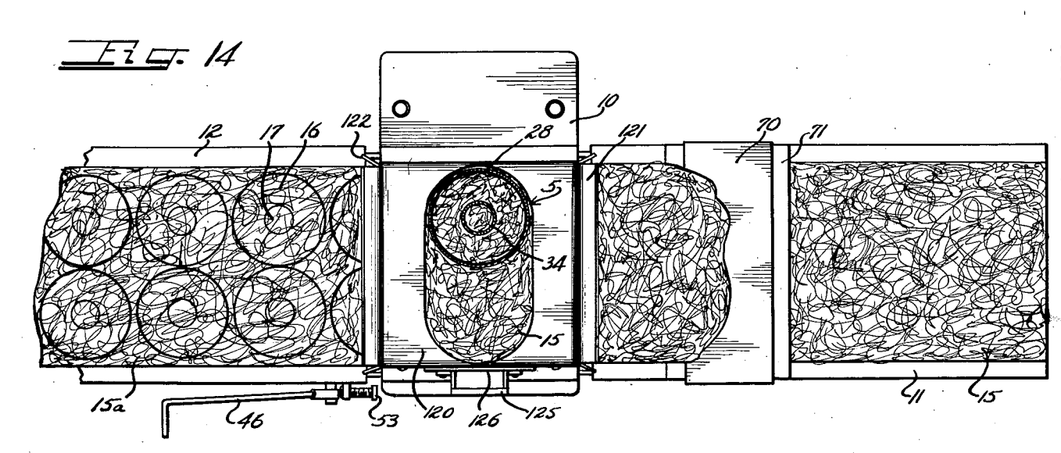
Figure 14 is an enlarged fragmentary plan sectional view illustrating the operation of the machine in the first step of severing a plurality of articles in a row from a batt of material, this figure being taken substantially as indicated by the line XIV—XIV of Fig. 2.
Figure 15:
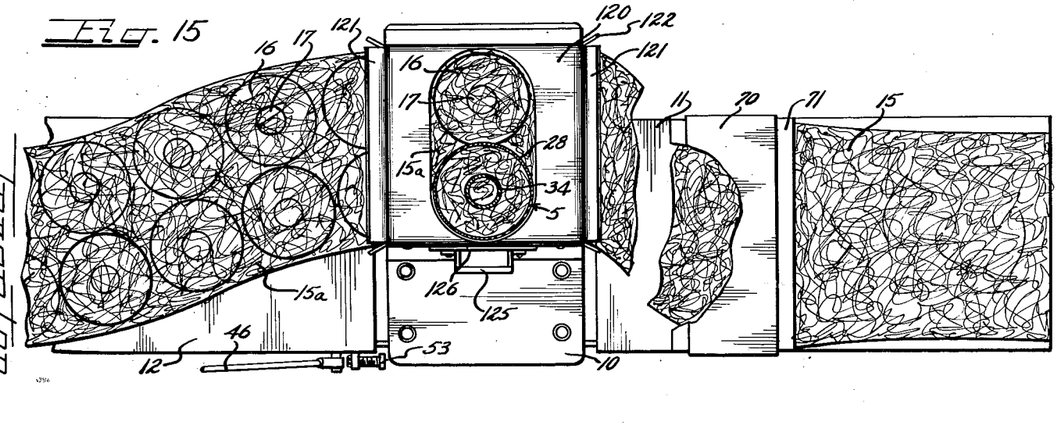
Figure 15 is a view similar in character to Fig. 14, but showing the mechanism in a later stage of cutting, after the batt has been shifted by actuation of the shifting element.

With reference now to Figs. 14 and 15, it will be seen that a substantially continuous batt 15 of material may be provided and advanced through the machine successively over the bed plates 11, 10 and 12. Assuming for example that it is the purpose to manufacture filter elements for air cleaners, a satisfactory batt may be composed of vegetable fibers, such as sisal, animal hair, or some equivalent and satisfactory fibrous material. That material is first curled, crinkled, crimped, or otherwise undulated, separated into loose fibers, and those fibers then joined together at points of contact by the application of a suitable plastic bonding agent. As a result, a batt is formed which may be of any desirable length, thickness, or width. The width, of course, is usually just sufficient to permit the cutting of a certain number of articles transversely of the batt so as to avoid waste. The thickness of the batt depends upon the desired thickness of the resultant article, no noticeable thickness being lost by virtue of the severance of the article with the instant machine. When completed, such a batt will be self-sustaining, highly resilient, and substantially uniform in density. The batt may be compressed to a considerable extent and will return to its original size upon release of the pressure.

Heretofore, such a batt has been extremely difficult to cut. A straight smooth cutting edge will compress the batt before severing the respective strands, and consequently when the cutter is passed through the batt, the side or edge of the resultant article is ragged and frayed. Then too, with a rapidly moving cutter, and with much compression of the batt, objectionable heat may result from friction and cause injury both to the article as well as to the cutting head. As will more fully later appear, the instant invention eliminates such possible adversities, and will cut from the batt articles externally smooth and uniform as to size, and will do such cutting very rapidly and easily.

In the cutting of one of the filter elements 16 shown in Figs. 14 and 15, separate cuts are made, once adjacent one side edge of the batt, and then adjacent the opposite side edge of the batt, the batt being shifted transversely to permit the second cut, and not moved longitudinally during both cuts. At the same time the circular element 16 is cut, a central plug 17 is cut free from that element to provide the desired central opening through it. After these elements are cut, they are retained in the batt skeleton 15a and carried along therewith for later separation therefrom.

*The cutting means and cutting bed plate*

The mechanism employed to sever the articles from the batt 15 may best be described with reference to Figs. 2, 3, 5 and 10. Looking at Fig. 10 there is shown a spindle 18 which extends through the quill 4 and is rotated by the aforesaid motor 3. The rotation of this spindle is constant during the time the machine is in operation. The lower end of the quill 4 is expanded into a head 19 so as to provide adequate room for bearing means around the spindle, and permit the attachment of a sealing element 20, somewhat in the form of a labyrinth seal. The spindle 18 projects below the quill head 19, and the portion of this spindle is externally threaded as indicated at 21 and therebelow the spindle is externally smooth but internally hollow, this portion being indicated by numeral 22.

Figure 10:
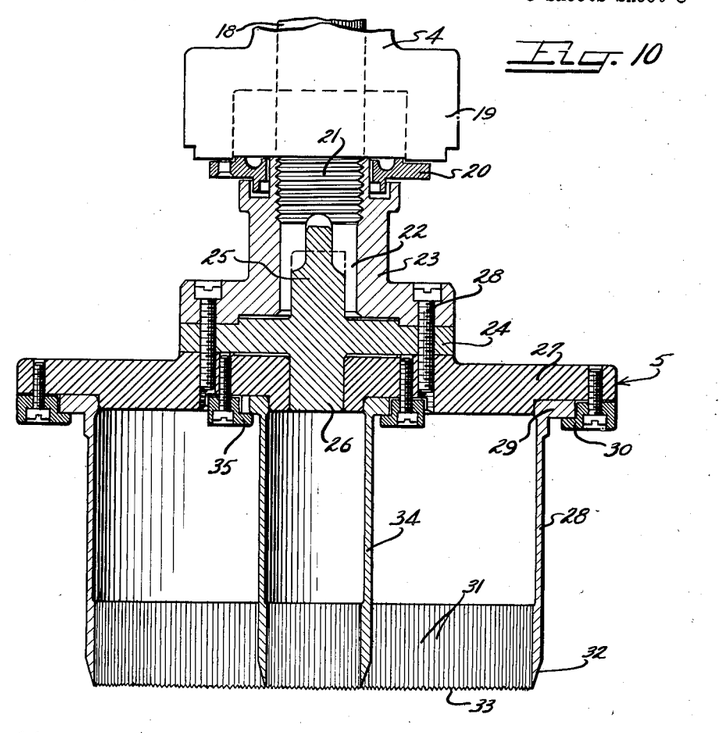
Figure 10 is an enlarged fragmentary central vertical sectional view, with parts in elevation, of the cutting element.

An adaptor to carry the aforesaid cutter head 5 is connected to the lower end of the spindle. The adaptor includes a bushing 23 which intimately surrounds the part 22 of the spindle, and is threadedly engaged with the part 21 of the spindle. The upper end of the bushing is shaped to embrace a portion of the seal 20, and the lower end of this bushing is enlarged in diameter to intimately receive a plate 24 having an upward central projection 25 intimately fitting inside the part 22 of the spindle, and a lower projection 26 intimately fitting in a central aperture of a head plate 27 which carries the cutting element. The bushing 23, plate 24, and head plate 27 may all be secured together by an annular series of bolts 28, thereby affording ready removal for the head plate, so that substitute plates may be readily used to permit the cutting of articles of different sizes.

The cutting head itself, including the head plate 27 and the cutting elements to be later briefly described, is more fully set forth, described and claimed in a Sandberg and Van Sickel pending application entitled "Cutting Tool," filed November 23, 1946, Serial No. 712,008, now Patent 2,564,451 granted August 14, 1951.

Obviously, the cutting elements are shaped in accordance with the desired shape of articles to be severed from the batt 15. In accordance with the severance of the hollow filter elements 16, the head is provided with a cylindrical cutter 28 having a lateral flange 29 at its upper end which seats in an annular recess of the underside of the head plate and is held in position by a locking ring 30 bolted to the head plate. This cylindrical cutter 28 at the cutting end thereof is provided with numerous grooves 31 extending longitudinally of the cutter and on the inside face. Immediately adjacent the lower end, the outer face of the cutter is beveled as indicated at 32, and this beveling together with the grooves results in a serrated cutting edge 33. The provision of the grooves on the inside face of the element aids greatly in the maintenance of the element at the proper sharpness, because when the element needs sharpening it is a simple expedient merely to grind the bevel 32.

The inside cutting element which removes the plug 17 from the center of the filter element 16 is also in the form of a metal cylinder 34 and of the same general construction as the cutter 28 with the exception of size. The inner cutting element 34 is held in place on the head plate 27 by means of a locking ring 35 bolted to the plate.

With this construction, it will be readily understood that in the event it is not desired to cut a filter element or similar article having an opening through the central portion, the inner cutter 34 may be removed. It will also be clear that cutters of different length may readily be secured to the head plate 27 as may be desired. Likewise, if it is desired to cut different diameters or shapes of articles, the entire head plate may be removed and a different head plate substituted carrying cutters of the requisite size and shape.

With reference now to Fig. 2, it will be seen that a hand lever 36 pivoted to the superstructure 2 at as 37 is utilized to raise and lower the quill 4, spindle 18, and cutter head 5. This lever carries a pin 38 acting through a slot 39 in the superstructure and connected to the quill 4. Pulling down upon the handle of the lever, an operator may lower the cutter head through the batt 15 and effect a cut moving the lever from the full line to the dotted line position as seen in this figure. One of the elements 16 may be severed from the batt 15 by the simple expedient of lowering the spinning cutting head through the batt by means of the hand lever 36.

Figure 5:
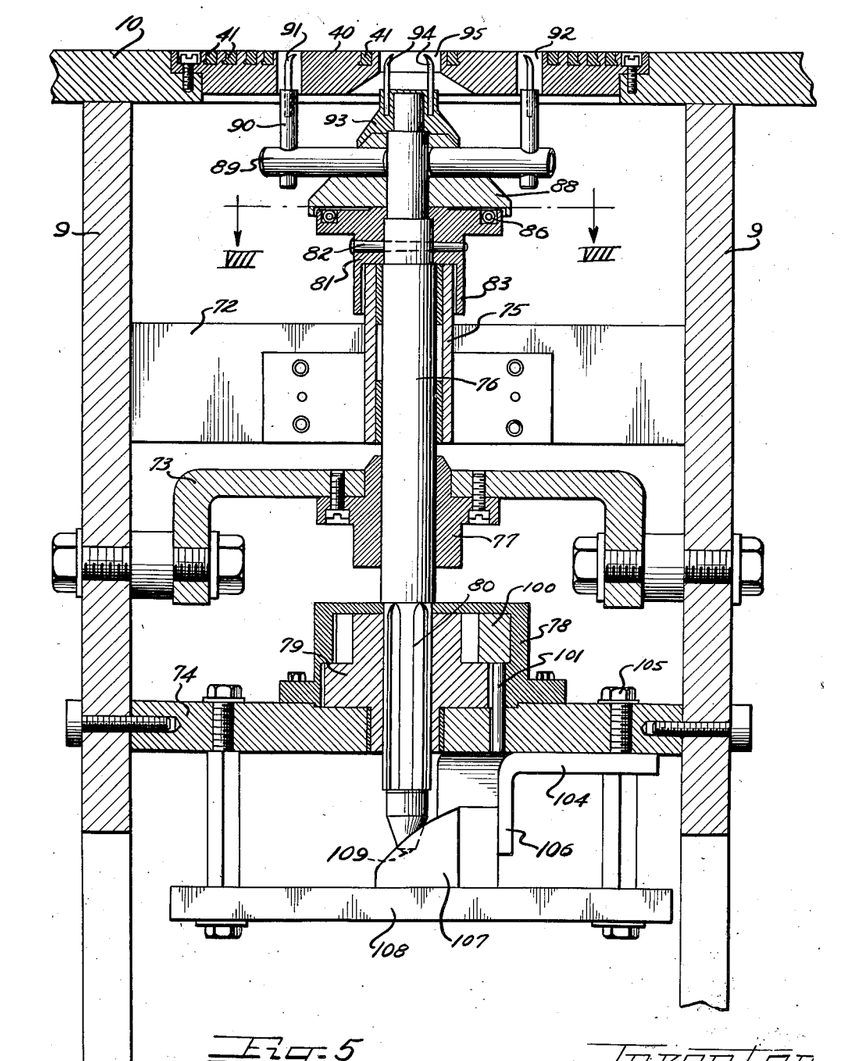
Figure 5 is an enlarged fragmentary vertical sectional view taken substantially as indicated by the line V—V of Fig. 2, illustrating the severed article holding mechanism in retracted position.

With reference now to Figs. 3 and 5, it will be noted that means are provided in the cutting bed plate 10 to protect the sharp edges of the cutting elements. To this end, an insert 40 is bolted into the bed plate 10 directly beneath the cutter. This insert is provided with a series of annular grooves arranged concentrically, and each groove may be filled with a ring 41 of fiber, babbitt or other suitable material. In completing a cut, the cutting edge of the cutter enters the respective protective protective ring 41 a short distance. Rings of different diameters are provided, of course, to accommodate cutters of different diameters.

Any suitable means may be provided to limit the downward movement of the cutter head so that the distance this head travels is not dependent solely upon the operator's judgment. In the illustrated instance (Figs. 1 and 2), a collar 42 embraces the quill 4 and travels therewith. This collar has secured thereto the lower end of an elongated bolt 43 extending through a stop bracket 44 on the superstructure 2, and the upper or free end of the bolt carries a pair of nuts 45 which may be set at any location along the bolt to govern the extent of movement of the cutter head in a downward direction.

*The batt advancing mechanism*

The mechanism by which the batt is periodically advanced beneath the cutter head may best be seen in Figs. 1 to 4, 11, 12 and 13. This mechanism is entirely under the control of a single hand lever 46 connected at its lower end to a pivot shaft 47 (Fig. 2). The hand lever is positioned to be actuated by the left hand of an operator standing in front of the machine. The operator may use his right hand on the control lever 36, and actuate the lever 46 with the left hand. With reference now to Fig. 2, it will be seen that a crank arm 48 on the shaft 47 is connected at its free end to a lever 49 extending across the front central portion of the machine, the other end of which is connected to a frame 50 pivoted as at 51 to part of the main frame of the machine. In order to actuate the frame 50 about its pivot rod 51, it is only necessary to swing the lever 46 back and forth through an arc determined by the setting of stop members 52 and 53 as seen in Fig. 1.

Figure 11:
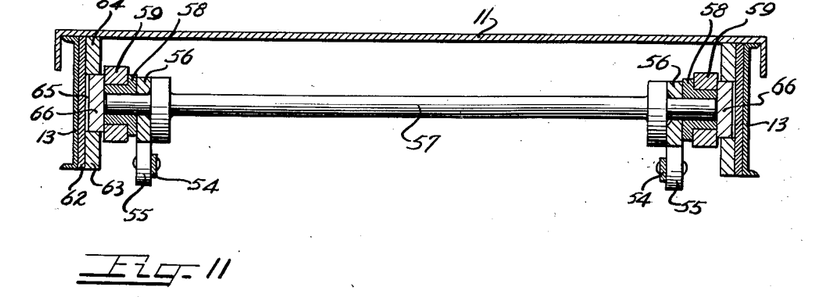
Figure 11 is an enlarged fragmentary transverse sectional view taken substantially as indicated by the line XI—XI of Fig. 4, illustrating the batt advancing mechanism.
Figure 12:
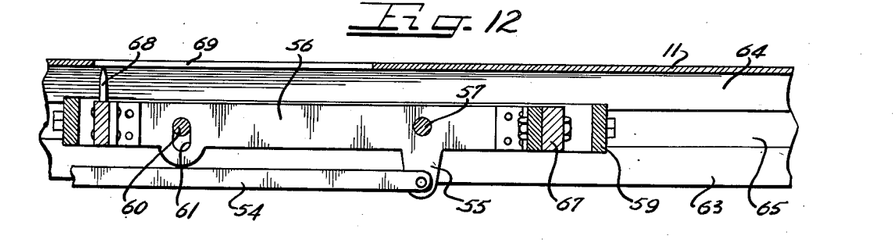
Figure 12 is an enlarged longitudinal vertical sectional view taken substantially as indicated by the line XII—XII of Fig. 4 illustrating a part of the batt advancing mechanism after an advance movement has been made, and in the position it assumes during a cutting operation.

Pivoted at one end to the frame 50, at the top thereof, is a pair of opposed bars 54—54, the free end of each of which is pivoted to a crank arm 55 depending from a side member of a rectangular frame 56 seen clearly in Fig. 4. This entire frame 56 may be rocked vertically about a rock shaft 57 that extends through the side members of the frame 56, and as seen in Figs. 4 and 11. The opposite ends of the shaft are seated in bearing members 58—58 carried in the side rails of another rectangular frame 59 that surrounds the frame 56. This frame 59 carries a transversely disposed shaft 60 fixed in the side rails of the frame, and the side rails of the frame 56 are each provided with an elongated slot 61 receiving the shaft 60. The up and down rocking movement of the frame 56 is thereby limited to the length of the slots 61 as seen clearly in Figs. 12 and 13.

Figure 13:
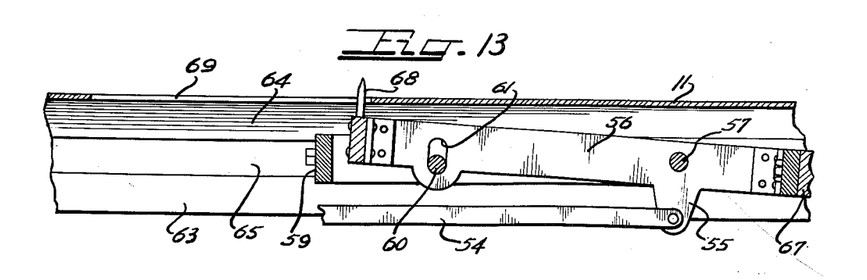
Figure 13 is a fragmentary view of the same character as Fig. 12 and taken in the same location, but illustrating a part of a batt advancing mechanism in position to start an advance movement.

With reference now to Fig. 11, it will be seen that the longitudinally extending side rails 13—13 of the main frame are each reinforced by a plate 62 which in turn carries a pair of upper and lower rails 63 and 64 forming a slide track 65 therebetween. At spaced points therealong riders 66 are secured, by welding or in an equivalent manner, to the side rails of the frame 59, and these riders are permanently positioned in the respective tracks 65. Consequently, when the lever 46 is thrown in either direction, the bars 54—54 move both frames 56 and 59 simultaneously along the tracks 65—65. If the movement of the lever 46 is to the right as the structure is seen in Figs. 1, 4, 12 and 13, the frame 56 is pivoted downwardly to the position seen in Fig. 12 which shows this frame at the start of a right hand movement, and during the full course of movement of that frame it will remain in that downward position. When the lever is thrown in the opposite direction, the frame is immediately pivoted upwardly as seen in Fig. 13, which shows that frame at the start of a left hand throw of the lever. The rocking of the frame 56 is expedited by a weighted bar 67 attached to the outer cross member of this frame.

The inner cross bar of the frame 56 carries a plurality of upstanding pins 68 spaced in accordance with a plurality of longitudinally extending slots 69 in the bed plate 11. When the hand lever 46 is moved to the left, the frame 56 is rocked upwardly so that the pins 68 extend through the slots 69 as seen clearly in Fig. 13, and thus these pins stick into the batt 15 resting upon the bed plate 11. As seen in Figs. 1 and 3, a tunnel-like housing 70 having upwardly sloping marginal portions 71 at each end is mounted over the slots 69, so that the batt must travel beneath this member 70 which affords backing to insure the forcing of the pins 68 into the batt. As the hand lever continues its leftward motion, the frame 59 slides along the tracks 65—65, carrying therewith the frame 56, and the pins advance the entire batt along the bed plate 11. Upon a reverse movement of the lever, the frame 56 pivots downwardly to the position seen in Fig. 12 so that the pins are out of engagement with the batt.

*The severed article holding means and control therefor*

In view of the fact that the cutter continues to revolve at all times, it is necessary to keep the severed elements, in the illustrated instance the elements 16 and 17 as seen in Figs. 14 and 15, from revolving with the cutter after they have been cut loose from the batt 15, and it is also necessary to keep these severed elements from being lifted out of the batt when the cutter is raised free. To this end, automatically operated holding means are provided which engage the batt in position to hold the ultimately severed elements just prior to the cutting operation, and these holding means remain so engaged until the cutter has been elevated.

Figure 6:
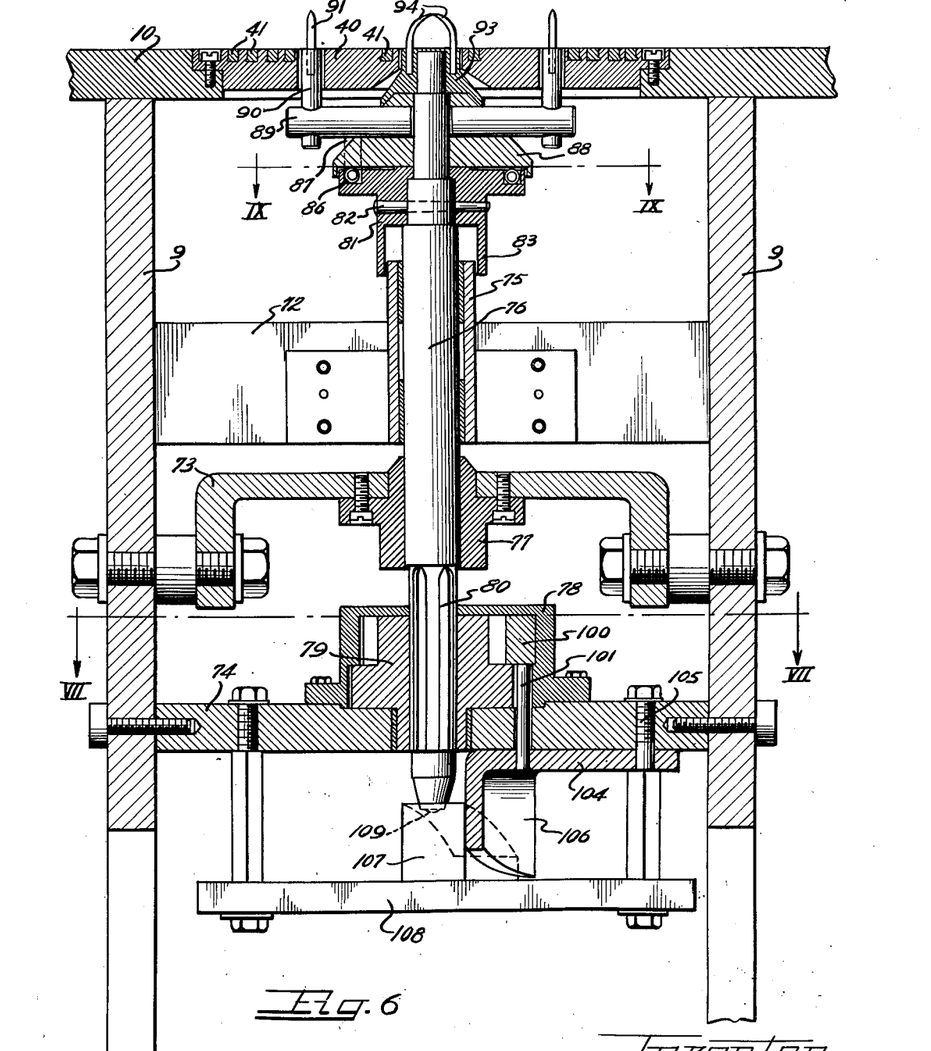
Figure 6 is a view identical with Fig. 5, but showing the severed article holding mechanism in operative position.
Figure 7:
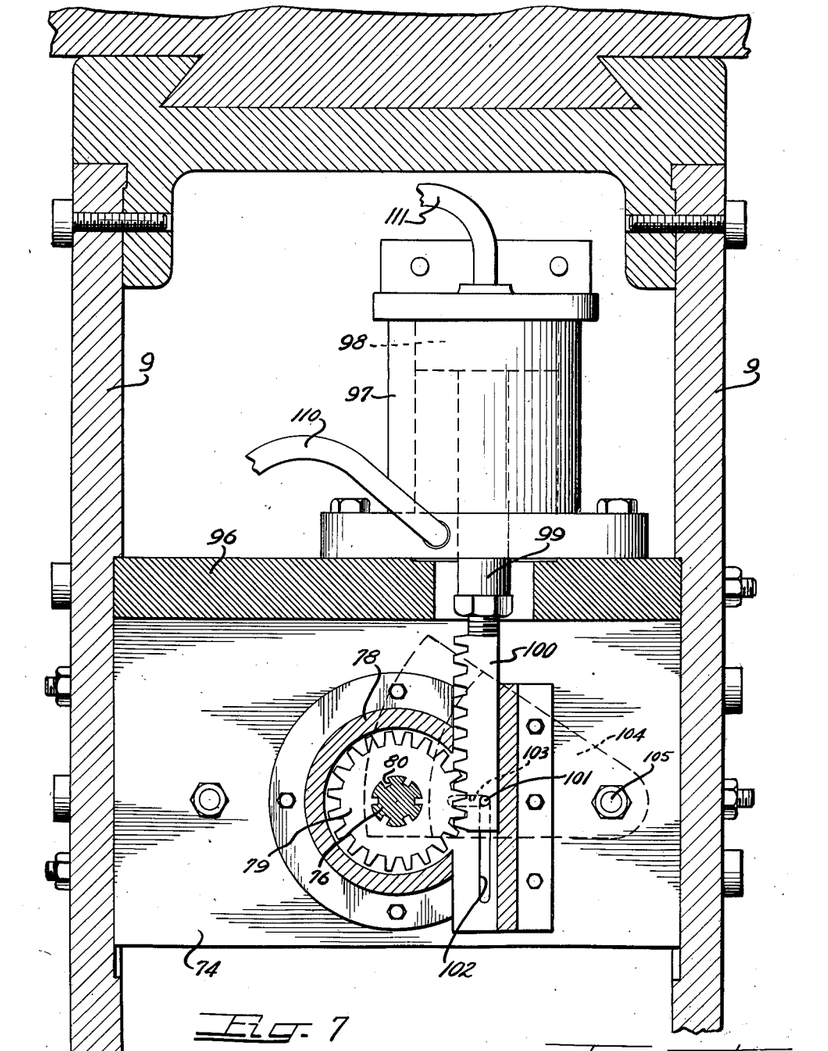
Figure 7 is a fragmentary plan sectional view illustrating the actuating means for the severed article holding mechanism, and taken substantially as indicated by the line VII—VII of Fig. 6.

With the reference now more particularly to Figs. 5, 6 and 7, it will be seen that between the forwardly extending plates 9—9 below the cutting bed plate 10 of the machine there are a series of transverse supports 72, 73 and 74. The transverse support 72 carries a guide sleeve 75 for a vertically disposed shaft 76 that both slides longitudinally and rotates during its operative movement. The transverse support 73 carries a bearing guide 77 for the same shaft. The transverse support 74 carries a housing 78 in which is disposed a gear 79 splined to the lower portion of the shaft as indicated at 80. The shaft will assume lowermost position by gravity, as seen in Fig. 5, and this downward movement of the shaft is limited by means of a flanged collar 81 keyed to the upper portion of the shaft as indicated at 82, the flange having a lower cylindrical portion 83 freely surrounding the upper end of the fixed guide sleeve 75, so that the collar rests upon the top of this guide sleeve when the shaft is in lowermost position.

Figure 8:
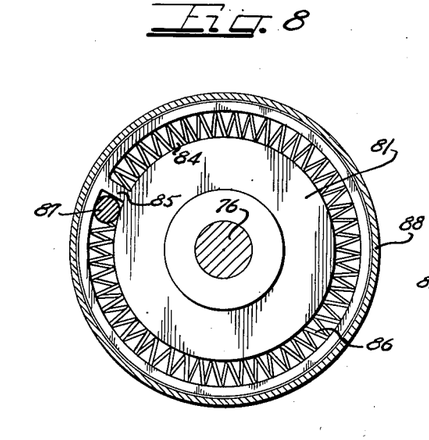
Figure 8 is an enlarged plan sectional view of a part of the severed article holding mechanism, taken substantially as indicated by the line VIII—VIII of Fig. 5.
Figure 9:
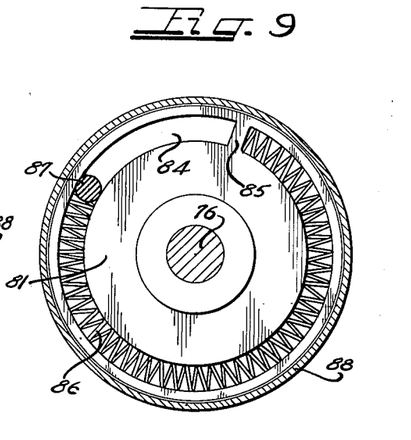
Figure 9 is also a plan sectional view of the same structure seen in Fig. 8, but taken substantially as indicated by the line IX—IX of Fig. 6.

As seen better in Figs. 8 and 9, the upper flanged portion of the collar 81 is provided with a substantially circular groove 84 which, however, is not completely annular, a relatively narrow radially extending abutment 85 defining the ends of the groove. This groove contains a horizontally disposed compression spring 86, one end of which presses against the abutment 85, and the other end of which is attached to a pin 87 depending from a head 88 (Figs. 5 and 6) floating on the upper portion of the shaft 76. This head, in the illustrated showing, carries four radially extending arms 89 and near the outer end of each of these arms 89 is a vertically disposed socket 90 for receiving a helical pin 91. At this point it may best be mentioned that the helical angle of these pins is in reverse direction to the rotation of the cutting head. The four pins 91 extend within suitable slots 92 (Fig. 3) in the insert 40 of the cutting bed plate 10, and these pins when elevated to the position seen in Fig. 6 embed themselves in the ring-like portion 16 of the article to be severed from the resilient batt 15.

In order to hold the severed plugs 17 in the center of the article being cut, another head 93 is fixed to the upper end of the shaft 76. This head 93 obviously must rotate with the shaft 76 and it carries a pair of helical pins 94 extending through a central opening 95 in the insert 40. It is obvious that the pins 94 or the head 93 must turn a greater number of degrees by virtue of their central disposition than the pins 91 carried on the floating head 88 in orler to insure positive anchorage with the resilient batt of material.

This varying degree of rotation of the respective heads is accomplished by the collar 81 and the spring 86 therein which causes a joint and thence independent operation of the two heads as may be explained best by the structures seen in Figs. 8 and 9. As viewed in these figures, the shaft 76 rotates clockwise as it rises to the position seen in Fig. 6 with the pins projecting through the insert 40 of the bed plate 10. By virtue of the spring 86, the floating head 88 will be rotated with the shaft and collar 81 until the pins 91 strike the ends of the respective slots 92 when rotation of the floating head must cease. However, the shaft and collar 81 continue to rotate thus compressing the spring to the position seen in Fig. 9, giving added rotation to the pins 94 on the head 93. When the shaft is permitted to drop to the position seen in Fig. 5, the head 93 will rotate in reverse direction first, and when the abutment 85 in the collar 81 contacts the pin 87 depending from the floating head 88, that floating head will turn along with the shaft and head 93 until the original retracted position is reached.

It will be noted that by virtue of the helical shape of the pins 91 and 94, and the fact that the heads carrying these pins rotate as they rise, the pins will follow a helical course in entering the batt of fibrous material, and follow the same helical course in reverse in moving out of the material to retracted position, so that there is no disarrangement or tearing of the fibers of the batt by virtue of the entrance, holding, and exit of the pins.

Cam means are utilized to elevate the shaft 76, and a rack is used to rotate the shaft simultaneously with its elevation, all under the control of compressed air means. With reference now more particularly to Figs. 5, 6, and 7, and especially Fig. 7, it will be seen that on a vertical partition 96 disposed between the plate members 9—9 just to the rear of the horizontal supporting member 74, an air cylinder 97 is mounted. As indicated by dotted lines in Fig. 7, this air cylinder contains a piston 98 carrying a plunger 99 that reciprocates horizontally. The outer end of this plunger carries a rack bar 100 which extends through the aforesaid housing 78 and meshes with the aforesaid gear 79 inside that housing. A pin 101 extends downwardly from the underside of the rack bar 100, and when the shaft 76 is in uppermost position this pin rests at the junction between an elongated outwardly extending slot 102 in both the housing 78 and the supporting plate 74, and a transverse slot 103 in a sector shaped member 104 beneath the supporting plate 74. The sector 104 is pivoted about a smooth portion in the shank of a bolt 105 (Fig. 6) so that it may swing about that pivot point upon in and out movement of the rack bar 100. The inner portion of the sector 104 is turned downwardly as indicated at 106 to support a cam member 107 that rides on a plate 108 suspended from the supporting plate 74 by means of the aforesaid bolt 105 and a complemental bolt. The working surface of the cam 107 bears against a ball 109 carried in the lower end of the shaft 76.

With reference again to Fig. 7, there are two air lines 110 and 111 leading to the forward and rear ends of the air cylinder 97, respectively. When air enters the cylinder through the line 110, the line 111 is open, and the piston 98 is forced suddenly rearwardly thereby causing the rack bar 100 to rotate the shaft 76, and pull the cam 107 beneath the ball at the lower end of the shaft thus elevating it and anchoring the pins 91 and 94 in the batt of material. When air enters through the line 111, the line 110 is open, and the piston is moved suddenly forwardly thereby rotating the shaft in the opposite direction, and moving the cam 107 out from under the lower end of the shaft to the position the cam is seen in Fig. 5 permitting the shaft to drop and retract the pins from the batt of material. As the structure is seen in both Figs. 6 and 7, the cam is beneath the shaft and the shaft is elevated.

The control means for the air cylinder are preferably mounted on the pedestal 1 of the machine, and are best seen in Figs. 1 and 2. On one side of the pedestal there is mounted a limit switch 112 having a protruding throw-arm 113 (Fig. 2) which limit switch may be connected by conductors 114 to a solenoid relay 115 mounted on the opposite side of the pedestal (Fig. 1). This solenoid relay operates a known form of three way poppet type fast acting air valve 116 which opens and closes the respective air lines 110 and 111.

With reference again to Fig. 2, it will be seen that the hand lever 36 for raising and lowering the cutter head is connected beyond the pivot point 37 by means of a linkage 117 to a vertically disposed bar 118 slidable in suitable straps mounted on the pedestal, and carrying a cam formation 119 to actuate the throw arm 113 of the limit switch. As the lever 36 is pulled downwardly to lower the spinning cutter head 5, the bar 118 rises, the cam formation 119 trips the limit switch, energizes the solenoid relay 115, which in turn controls the valve to open the line 111 and force air through the line 110, thus raising the shaft 76 together with the pins 91 and 94. Upon the upstroke of the lever 36, just as the cutter head is leaving the batt of material, the limit switch is actuated by the reverse movement of the bar 118 causing the solenoid and air valve to act in the reverse direction. The action of the piston in the air cylinder is extremely rapid in either direction.

Thus, it will be seen that the action of the severed article holding means is entirely automatic and while indirectly under the control of the operator, by virtue of his manipulation of the hand lever 36, entails no thought or effort on the part of the operator.

*The bat shifting element*

The batt shifting means are best seen in Figs. 1, 2, 14 and 15. As above explained in connection with Figs. 14 and 15, where two parallel rows of elements 16 are to be severed from the batt, it is necessary to first cut one element adjacent one side of the batt, and then bodily shift the central portion of the batt so as to bring the opposite side portion beneath the cutting head. This is accomplished by the simple sliding movement of a tunnel-like element 120 having obliquely upwardly extending flanges 121 on each open side thereof. Obliquely outwardly extending end flanges 122 are also provided at each end of the open side of the tunnel member to facilitate entrance of the batt into this member. As seen best in Fig. 2, the tunnel member is provided with a plurality of feet 123 having inwardly extending portions engaged in a groove 124 in the cutting bed plate 10 of the machine. At its forward end the tunnel element is provided with a suitable handle 125 and immediately behind that handle is an upstanding plate 126, preferably of transparent plastic through which the operator may view the action of the cutting head and the batt being cut, without danger.

The batt must obviously travel through the tunnel member 120 in passing over the cutting bed plate 10 of the machine. With reference now to Figs. 14 and 15, it will be seen that the batt may travel in a straight line for the first cut and the tunnel member will be in the position seen in Fig. 14, the first cut being made near the rear edge of the batt. When that cut has been completed, the tunnel member is pushed inwardly along the cutting bed plate to the position seen in Fig. 15, and then the second element may be severed from the batt along the front edge of the batt. It will be noted that when the tunnel element is pushed rearwardly, the batt is distorted, but the resiliency of the batt effectively permits such distortion without throwing the batt too far out of line to prevent a proper cut.

During a cutting operation, the operator may maintain his right hand on the lever 36 at all times, and keep his left hand upon the handle 125 of the shifting element 120, if he so desires. He need only release the handle 125 in order to operate the hand lever 46 to bodily shift the entire batt after two cuts have been made in the one position of the batt.

The operation in general

In view of the fact that the operation of the component parts of the machine have been above described along with the description of these parts, it will suffice at this point to merely give a general summary of the complete operation.

At the start, the opeartor of course places a batt 15 of material in proper position on the table of the machine and enters the batt through the tunnel member or guard 70. He then, of course, starts the motor 3 and opens the air lines from any suitable source of compressed air to the valve mechanism 116. The hand lever 46 is then moved to the right and back to the left, in order to pivot the frame 56, elevate the pins 68 into the batt, and advance the leading portion of the batt beneath the cutter head. After this motion, the lever is again moved to the right just sufficiently to cause a downward pivoting of the frame 56 and retract the pins 68 from the batt so as to provide no interference whatever with the ultimate shifting of the batt sidewise.

The hand lever 36, actuating the cutter head, is then pulled downwardly to lower the cutter into the batt. As the cutter head moves downwardly, the limit switch 112 is automatically closed to acuate the solenoid relay governing the air valve mechanism admitting air through the line 110 to drive the piston 98 rearwardly and thus cause both a rotation and an elevation of the shaft 76 to anchor the helical pins 91 and 94 in the parts of the batt to be severed. This all occurs during the downward motion of the cutter, and as the spinning cutter enters the batt it severs the elements 16 and 17 from the batt, the pins 91 and 94 holding these elements in position within the batt, preventing them from spinning with the cutter, then preventing them from being elevated out of the batt skeleton when the cutter head is raised. The hand lever 36 is then elevated to raise the cutter out of the batt, and this action automatically moves the throw lever of the limit switch 112 in the opposite direction, causing the air cylinder piston to rotate the shaft 76 in the reverse direction and permit the shaft to drop so as to release the pins 91 and 94 from the severed portions 16 and 17 of the batt.

The operator then pushes the batt shifting element inwardly by means of the handle 125, thus distorting the batt laterally to the position seen in Fig. 15, and repeats the cutting operation. At the termination of the second cutting operation, the batt shifting element 120 is pulled back to original forward position, and the hand lever 46 is again actuated to the right and the left to bodily shift the batt to bring an uncut portion beneath the cutter head for a repetition of the operation.

It will be understood, of course, that the entire machine could be arranged for automatic operation without departing from the principles of the instant invention, but with the machine as disclosed in the drawings and as hereinabove described, a single operator should produce between two and three thousand severed elements in a normal day's work. Also, while the severed parts 16 and 17 may readily be removed from the batt skeleton 15a by hand, the bed plate 12 may be provided with respectively sized and spaced apertures through which these parts may be pushed by any suitable means. This latter arrangement is especially desirable if discharge chutes or conveyors are provided for the respective parts 16 and 17.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. In a machine to sever articles from a resilient batt of fibrous material, a bed plate, a cutter movable to and from said bed plate, means to advance an elongated batt over said plate, means to actuate said cutter, holding elements arranged to engage the parts of said batt to be severed and retain those parts in the batt skeleton after the cutting operation, and batt shifting means to laterally distort the portion of the batt in which cuts are being made relatively to the remainder of the batt to permit a plurality of rows of articles to be severed from the batt with a single cutter.

2. In a machine to sever circular articles from a batt of fibrous material, a bed plate, a rotary cylindrical cutter, means to move said cutter toward and away from said bed plate, means to advance a batt along said bed plate to cutting position, and a plurality of helical pins mounted to pass through said bed plate and engage said batt during a cutting operation to prevent movement of the severed article with the cutter.

3. In a machine of the character described, a bed plate on which material to be cut is disposed, a rotary cylindrical cutter, a second cylindrical cutter concentric with and fixedly connected for operation with the first said cutter, said bed plate having openings therein, and a set of helical pins arranged to pass through such openings and engage the material in locations corresponding to the piece severed by each said cutter upon movement of the cutters toward said bed plate.

4. In a machine of the character described, a bed plate over which material to be cut may be advanced, a cutter movable toward and away from said bed plate to cut the material, means to hold the material comprising a vertically disposed shaft beneath said bed plate, a head on said shaft, helical pins carried by said head, said bed plate having openings through which said pins may pass into engagement with material to be cut when said shaft is elevated, and means to both raise and partially rotate said shaft upon a movement of said cutter toward said bed plate.

5. In a machine of the character described, a bed plate over which material to be cut may be advanced, a cutter movable toward and away from said bed plate to cut the material, means to hold the material comprising a vertically disposed shaft beneath said bed plate, a head on said shaft, helical pins carried by said head, said bed plate having openings through which said pins may pass into engagement with material to be cut when said shaft is elevated, a gear splined to said shaft, a piston carrying a rack bar meshed with said gear, a pivotal elevating cam movable beneath said shaft, means connecting said rack bar and said cam, and control means responsive to a movement of said cutter to actuate said piston.

6. In a machine to simultaneously sever two concentric articles from a batt of fibrous material, a bed plate over which a batt may be advanced, a cutting head movable toward and away from said bed plate to cut the material, said bed plate having openings therein out of alignment with the cutter on said head, means to hold the material comprising a vertical shaft beneath said bed plate, means to both rotate and elevate said shaft, and a double set of batt engaging elements on the upper end of said shaft to pass through the openings in said bed plate into the portions of the batt to be severed.

7. In a machine to simultaneously sever two concentric articles from a bat of fibrous material, a bed plate over which a batt may be advanced, a cutting head movable toward and away from said bed plate to cut the material, said bed plate having openings therein out of alignment with the cutter on said head, means to hold the material comprising a vertical shaft beneath said bed plate, means to both rotate and elevate said shaft, and a double set of batt engaging elements on the upper end of said shaft to pass through the openings in said bed plate into the portions of the batt to be severed, said elements being helical and one set of said elements being inside the other set and rotatable to a greater extent than the other set to compensate for the different distances from said shaft.

8. In a machine to simultaneously sever two concentric articles from a batt of fibrous material, a bed plate over which a batt may be advanced, a cutting head movable toward and away from said bed plate to cut the material, said bed plate having openings therein out of alignment with the cutter on said head, means to hold the material comprising a vertical shaft beneath said bed plate, means to both rotate and elevate said shaft, a floating head on said shaft carrying helical pins to extend through certain of said openings and engage the larger of the articles being severed from the batt, a fixed head on the upper end of the shaft carrying helical pins to engage the smaller of the concentric articles, a collar fixed to said shaft below the floating head and having a substantially annular recess therein, a compression spring in said recess, and a pin depending from the floating head and abutting one end of said spring, whereby when the pins on the floating head have reached the limit of the respective openings in the bed plate the shaft and fixed head rotate further against the action of said spring.

9. In a machine to cut parallel rows of articles from a comparatively thick elongated batt of loosely bonded fibrous material, including a bed plate over which the batt may be intermittently advanced, a cutter movable toward and away from said bed plate, and a tunnel-like member through which the batt must pass slidable transversely across said bed plate and having an opening in the top at least twice the size of said cutter to shift the batt transversely after one cut has been made to permit a second cut beside the first, said cutter passing through the opening in said tunnel-like member when making a cut.

10. In a cutting machine, a bed plate to support material to be cut, a rotary cylindrical cutter movable toward and away from said bed plate to successively sever sections from material thereon, said bed plate having an opening therein inside the cutting area of said cutter, and gripping means movable through said plate from the side opposite said cutter to engage the material and hold each cut section to the plate upon the withdrawal of the cutter.

11. In a cutting machine to sever sections from a relatively thick resilient batt of loosely bonded fibrous material, a bed plate, a tubular rotary cutter movable toward and away from said bed plate to successively sever sections from material on the plate, said plate having an opening therein within the area of cut of said cutter, and a penetrating element movable through said opening from the side of the plate opposite said cutter to hold a severed section to the plate and prevent it moving with the cutter upon the withdrawal of the cutter.

RAY A. SANDBERG.

REFERENCES CITED

The following references are of record in the file of this patent:

UNITED STATES PATENTS

| Number | Name | Date |
|---|---|---|
| 863,011 | Anderson | Aug. 13, 1907 |
| 889,513 | Elder | June 2, 1908 |
| 1,396,185 | Furber | Nov. 8, 1921 |
| 1,413,663 | Kent | Apr. 25, 1922 |
| 1,560,918 | Stubgen | Nov. 10, 1925 |
| 1,581,101 | Copp | Apr. 20, 1926 |
| 1,589,176 | Hubbard | June 15, 1926 |
| 1,985,356 | Van Cleef | Dec. 25, 1934 |
| 2,089,803 | Kohler | Aug. 10, 1937 |
| 2,165,614 | Cook | July 11, 1939 |
| 2,196,209 | Glunz | Apr. 9, 1940 |

FOREIGN PATENTS

| Number | Country | Date |
|---|---|---|
| 605,159 | France | Feb. 13, 1926 |